April 25, 1933.   C. K. POWELL   1,906,094
EGG MARKING APPARATUS
Filed April 27, 1929   3 Sheets-Sheet 1

INVENTOR.
Charles K. Powell
BY
ATTORNEYS.

April 25, 1933.　　　C. K. POWELL　　　1,906,094
EGG MARKING APPARATUS
Filed April 27, 1929　　　3 Sheets-Sheet 2
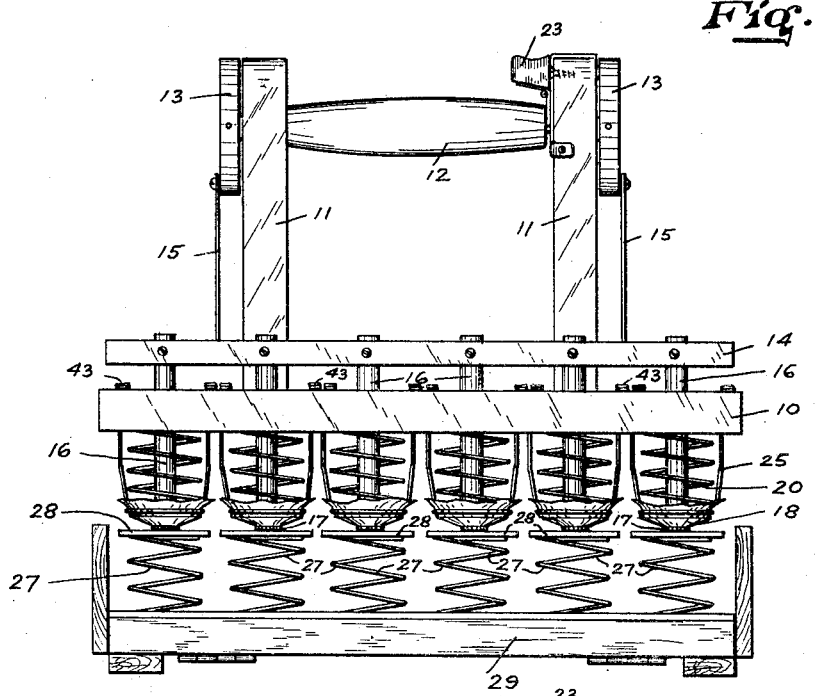
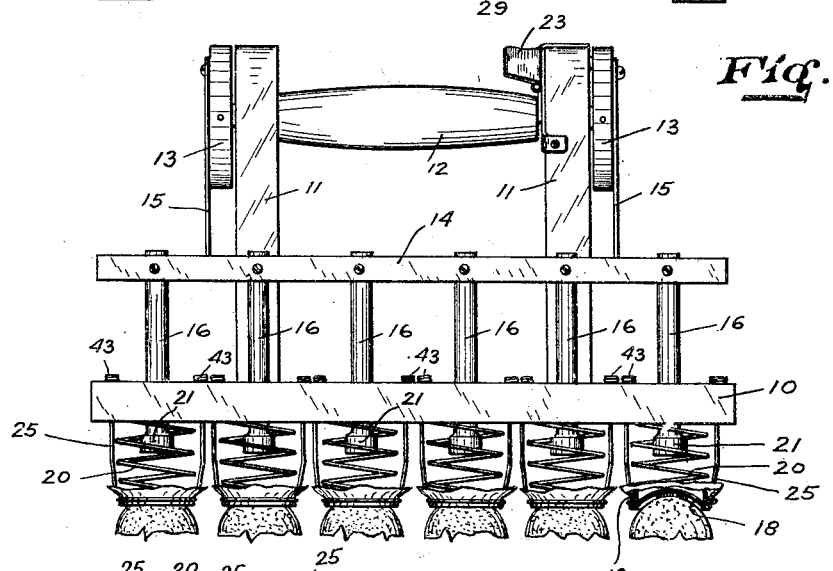
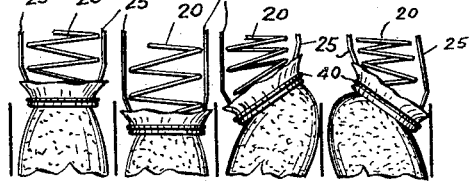
INVENTOR.
Charles K. Powell
BY
ATTORNEYS.

April 25, 1933.  C. K. POWELL  1,906,094
EGG MARKING APPARATUS
Filed April 27, 1929  3 Sheets-Sheet 3

INVENTOR.
Charles K Powell
BY
ATTORNEYS.

Patented Apr. 25, 1933

1,906,094

UNITED STATES PATENT OFFICE

CHARLES K. POWELL, OF DOBBS FERRY, NEW YORK, ASSIGNOR TO PACIFIC EGG PRODUCERS COOPERATIVE, INC., OF NEW YORK, N. Y., A CORPORATION OF NEW YORK

EGG MARKING APPARATUS

Application filed April 27, 1929. Serial No. 358,508.

This invention relates to the marking of eggs or like articles with words, figures or designs, and with respect to its more specific features, to an apparatus wherewith a large number of eggs may practically and efficiently be marked in a single operation.

Among the important objects of the invention are:

The provision of a simple and practical apparatus for simultaneously marking eggs or other fragile articles in quantity, as a dozen or more or less at a time, as distinguished from marking individual eggs one after the other by separate operations; wherewith efficient marking of different eggs may simultaneously be accomplished notwithstanding the eggs be of different contours or of different sizes, or present themselves to the marker in different positions or angles or at different levels; wherewith the marks or printing impressions on different eggs may be substantially uniform in printing impression notwithstanding the eggs be of different sizes; wherewith the printing impression on different eggs may be of even and clean-cut appearance, and may be effected simultaneously on a quantity, or batch, of eggs with a high degree of safety against breakage of eggs; wherewith the operation of marking may quickly be repeated on different batches, or quantities, of eggs without loss of time and with assurance of clean-cut marking of each batch, and wherewith uniform inking of numerous separately movable markers may quickly and efficiently be accomplished.

It is also an object of the invention to provide an apparatus of the character referred to, and which may be utilized by a relatively inexperienced operator, and which will evenly and properly mark or imprint the eggs when arranged in cartons, cells, or other container.

A further object is that of providing an apparatus of the character referred to, the parts of which will be relatively few in number and rugged in construction, the parts being capable of ready assemblage to furnish an efficient device of a desirable and practical construction.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figure 7:
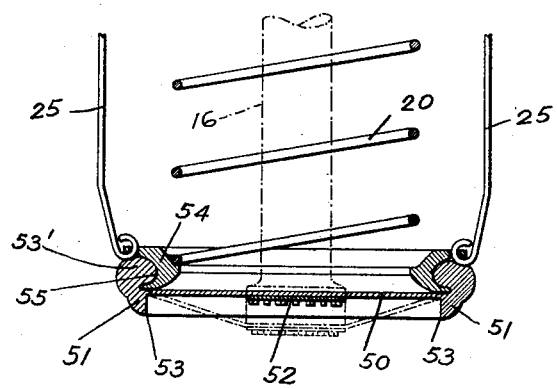
Figure 8:
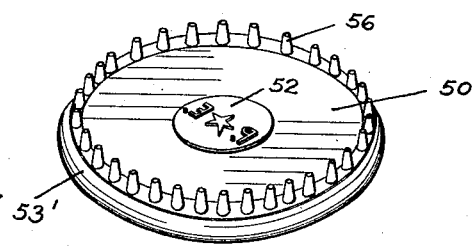

Fig. 4 diagrammatically illustrates the marking apparatus in position for receiving ink from the inking device;

Fig. 5 illustrates the marking apparatus in operative relation in one marking relation to the eggs;

Fig. 6 diagrammatically illustrates certain different positions which the markers may simultaneously assume relative to each other during the marking operation;

Fig. 7 is an enlarged central sectional view showing a modified form of the marker carrier, and Fig. 8 is an inverted perspective view of a further modified form of marker carrier.

Referring now more specifically to the drawings, the numeral 10 indicates a main frame which, in the present embodiment, is a pressing frame in that through this frame the marking pressure is applied to the eggs. In the present embodiment the frame 10 is of a portable character and is provided with posts 11 which support a handle 12. By grasping the handle 12, the apparatus may be carried and operated. The numerals 17 indicate a plurality of markers having thereon the desired indicia to be imprinted upon the eggs, as for instance letters, a date, or trademark. Each of these markers 17 is separately mounted on the pressing frame 10, and they are disposed side by side as illustrated. Each marker 17 is connected to a marker-carrier 19, which carrier, in the present embodiment, includes a ring, or ring-frame, made of metal or other relatively stiff or rigid material, and also includes a soft, flexible sheet 18 suspending the markers 17 centrally of the ring-frame 19. The flexible sheet 18 is clamped to the ring-frame 19 by a cord or wire 40 exteriorly surrounding the ring-frame. That edge of the ring-frame facing the pressing frame 10 has a flange 41. Pivotally connected to the flange 41 is a peripheral series of links 25, these links being slidably connected to the pressing frame, said frame having apertures 42 through which the links pass, the links having heads 43 adapted to coact with the pressing frame 10 to limit the extent of outward movement of the links and thereby in a great measure to limit the extent of movement of the markers 17 from the pressing frame 10. The markers are urged in a direction from the pressing frame 10 by resilient devices, the resilient devices of the present embodiment including helical springs 20 intervening the markers and the frame 10 and disposed to cushion the markers against marking pressure. The springs 20 are carried with the pressing frame 10, one end of these springs being seated in recesses 430 in frame 10, which recesses restrain lateral displacement of this end of the springs, the other or outer end of the spring being adapted to contact the flange 41 of the ring-frame 19. In this wise, movement of the markers 17 toward the frame 10 is resiliently resisted by the springs 20, and these springs transmit the marking pressure to the markers and to one marker separately from another.

Also, it will be noted that by the construction described the markers and the marker-carriers are movable relative to each other not only toward and from the pressing frame 10 but to some extent laterally, although the links 25 have a generally centering effect on the markers. It will furthermore be noted that the relatively stiff or rigid ring-frames 19 are interposed between the springs 20 and the markers 17, so that the springs 20 do not contact the marking area of the markers.

In the present embodiment, the markers 17 are of relatively soft, flexible material, such as a proper quality of rubber, which, during the marking operation, is adapted to cooperate to flex and bend into the contour presented by the egg to be marked. In this wise the markers 17 can flex into marking contours differing from each other as the contours of the eggs to be marked differ from each other, so that in the marking operation the markers will, as it were, fit the varying contours of different eggs and efficiently apply the marks thereto. For purposes of clearer disclosure, the marker 17 is illustrated as being a separate rubber sheet or disk having the desired indicia thereon, this disk being cemented or otherwise smoothly attached to the soft, flexible sheet or disc 18. It is to be understood, however, that the sheet 18 may be of the same quality of rubber hereinbefore mentioned, and have the marking indicia integral therewith at its central portion instead of cemented thereon.

In the present embodiment, the marking apparatus is equipped with devices adapted to hold or retain the markers 17 in a substantially uniform, or the same, inking plane for receiving ink from time to time. As illustrated, for each marker 17 there is a plunger 16 which is reciprocally movable adjustably on the frame 10 into and out of contact with the marker 17. There is a series of plungers 16, one for each marker, and each plunger 16 passes through an aperture 44 in the frame 10 and is pinned to a plunger supporting plate 14 which is reciprocally movable toward and from the markers 17, the posts 11 extending through openings in the plate 14. Carried by the frame 10 is a mechanism for reciprocally moving and adjusting the plungers 16. While this mechanism may be of any practical construction capable of accomplishing the result, the construction disclosed herein has special advantages when associated in a portable hand-operated apparatus. The handle 12 is a part of a rotatable shaft, the ends of this shaft being journaled in the posts 11, there being crank disks 13 fixed to the ends of this shaft, the disks 13 being coupled to the plate 14 by connecting rods 15 pivoted to the disks and plate, as at 45 and 46.

By adjustably rotating the handle 12, the plungers 16 may be simultaneously lifted from contact with the markers 17, or simultaneously lowered into contact with these markers. For holding the plungers 16 in adjusted position, a latching mechanism may be employed. In the embodiment illustrated, this latching mechanism includes a latch pin 22 movable in the post 11 into and out of either of the diametrically related latch openings 24 in one of the disks 13. Coupled to the latch pin 22 is a thumb piece 23 which is disposed in convenient position to be actuated by the thumb while the handle or shaft 12 is within the grasp of the operator. As illustrated, the thumb piece 23 is pivoted to the post 11 as at 47, and is operatively connected to the latch pin 22, so that depression of the thumb piece withdraws latch pin 22 from the registering latch opening 24, a spring 48 being employed for urging the pin 22 into the latch opening 24 in registry with the pin.

Figure 1:
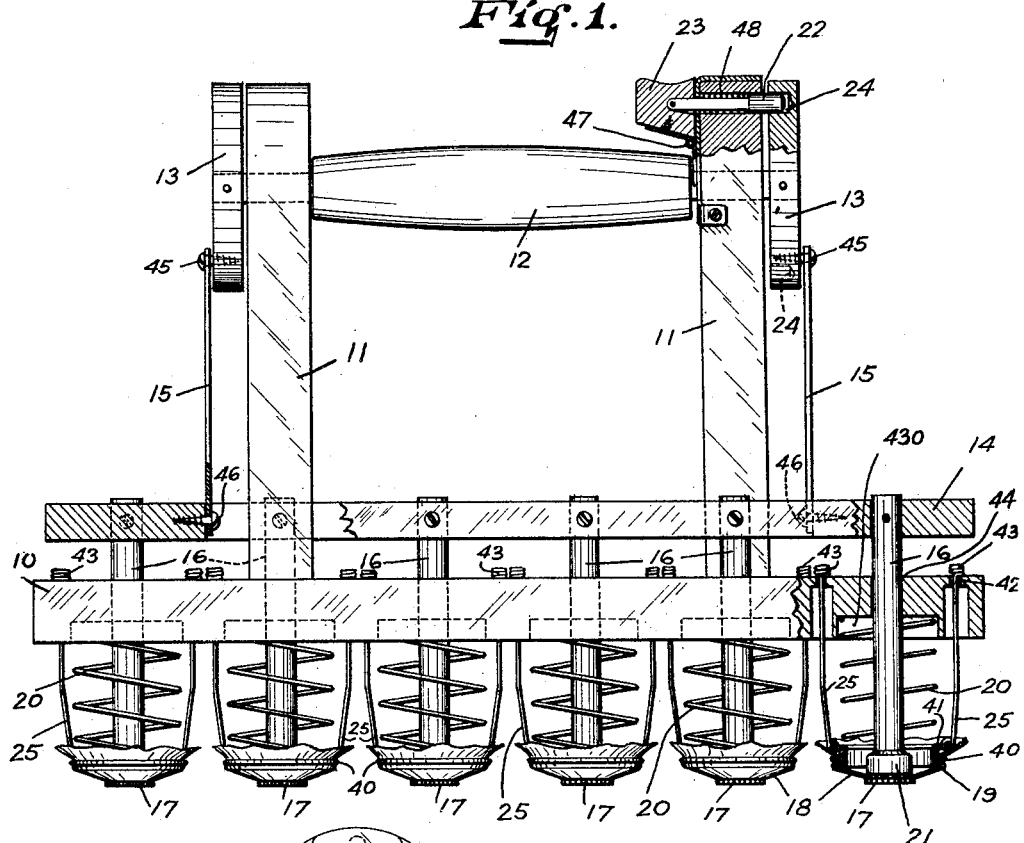
Fig. 1 is a side elevation of a marking apparatus embodying the invention, certain portions being in section.
Figure 2:
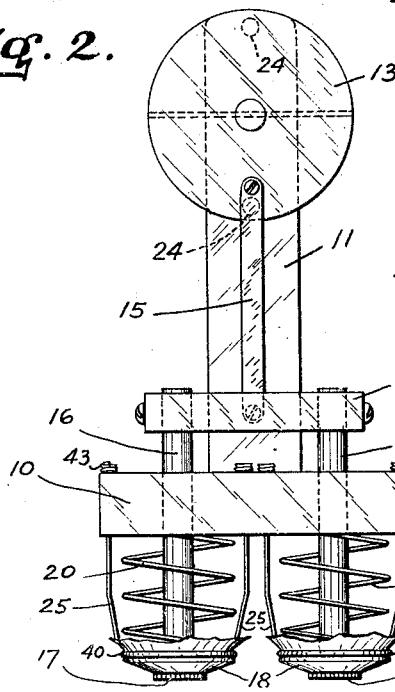
Fig. 2 is an end elevation of Fig. 1.

It will be seen that, in the present embodiment, the handle 12 is a member which controls the position of the plungers 16 by its adjustable movements on the frame. When the latch pin 22 is in engagement with one of the latch openings 24, as for instance illustrated in Fig. 1, the disks 13 are latched against rotation and the plungers 16 are held in their marker-contacting position and so as rigidly to oppose movement of the markers 17 toward the frame. When the latch pin is in engagement with the other latch opening 24, which is the condition illustrated in Fig. 5, the plungers 16 are in elevated position out of contact with the markers 17 so that these latter, and the ring-frames 19, are permitted to move toward and from the pressing frame 10. Preferably, the amplitude of adjustably reciprocal movement of the plungers 16 is such that the ends of the plungers press strongly against the flexible markers 17 and tauten the marking area across said end. By making the ends 21 of the plungers 16 flat and of an area corresponding to that of the flexible markers 17, each of these markers is planified by reason of being flattened into a single plane efficient for being readily inked in uniform degree over all.

The eggs to be marked are assembled side by side. A convenient support for the eggs is the customary container having cells in which the eggs lie in separated condition with their upper ends exposed in the cells. The markers 17 are laterally spaced from each other in general conformity to the spacing of the eggs in the carton. In the embodiment illustrated in the drawing, there are two rows of markers 17 side by side, adapted for marking twelve eggs in one operation. The operator grasps the handle 12, frees the latch pin 22 by operating the thumb piece 23, and rotates the handle 12 to lift the plungers 16 to the position exemplified in Fig. 5, in which the flat ends of the plungers 16 are at a considerable distance from the markers 17. Thereupon, the marking apparatus is bodily pressed upon the exposed ends of the eggs in the carton so that the markers respectively are brought into contact with the exposed ends thereof. When the axes of the eggs are parallel and upright, the centers of the markers will first contact the eggs, and thereafter continued movement under the downward marking pressure will coact to flex or bend the markers 17 in conformity with the contours of the respective eggs, so that the upper ends of the latter will be in a measure enveloped in the bent marker, which latter will lie in close contact along the curved contour of the respective eggs. These markers or marker carriers 17 are therefore, in effect, in the nature of flexible diaphragms capable of lateral flexure so as to readily conform to the surfaces with which they are pressed into engagement. The marking pressure will be transmitted to the eggs through the springs 20 or other resilient devices which may be employed. In order that the marking pressure on the eggs may be in a measure controlled and limited, springs should be selected having a sufficient resilient effect to impart a strong and firm marking pressure to the eggs without crushing them, and a length of spring is preferably selected which will permit the firm pressure to be applied to eggs the tops of which lie at different levels in the carton. In this wise simultaneous marking of all eggs will be assured even though their tops lie at different levels, the markers being mounted for up and down movement relative to each other for the purpose. In case the axes of the eggs lie at different angles to each other, as for instance illustrated in Fig. 6, the markers 17 will nevertheless flex into conformity with the egg surfaces presented thereto and efficient marking thereof will be accomplished.

Also, it will be observed that the marker carriers, or ring-frames, 19 may individually and separately tilt in different planes and divers directions relative to each other so as to promote effective marking contact between the markers 17 and the eggs lying at different inclinations. During the marking of the eggs, the ring-frames and the markers will move toward the pressing frame, the springs 20 being thereby compressed. Having marked the batch of eggs, the apparatus is lifted therefrom whereupon the springs 20 move the markers and ring-frames in a direction away from the frame 10 and also restore the markers to position in a generally uniform plane.

Upon removing the markers from the eggs, there may be some vibration of the markers either laterally or longitudinally and if this vibration were maintained to the operation of marking the next batch of eggs, it might result in imparting an indefinite or smeary mark to the latter eggs. In the present embodiment, however, means are provided for quickly arresting such vibration of the markers. The means illustrated includes the links 25 which are carried by the pressing frame and are connected to, or are in contact with, the springs through the ring-frames, and thereby coact as vibration arresters for the springs. Also, the links 25 vibrate with the markers and participate in arresting vibration thereof. In the present embodiment, each marker has its individual vibration arresting means including the series of links 25, so that any tendency of the markers to vibrate is checked immediately upon being lifted from the eggs.

The vibration arresters are devices closely associated with the springs or with the markers vibrated by the springs, movement of these devices being restricted more or less as by being connected to a portion of the frame or other member relative to which the spring may vibrate. Instead of employing the links 25 as vibration arresters, they could be replaced or supplemented by chains connected to the frame 10 and to the ring-frame 19. As before explained, the springs 20 thrust the ring-frames and the markers away from the frame 10 into a common, uniform plane. In order to limit the extent of movement of the markers away from the frame 10 by the springs 20, stop devices are utilized. In the present embodiment the links 25 also subserve the purposes of such stop devices, as will be clear from Fig. 1, wherein the heads 43 of the links contact with the frame to limit outward movement of the links and thereby limit outward movement of the marker carrier 19 as well. In respect to these stops, it will be observed that the wire links 25 might also be replaced by chains or cords. The provision of relatively stiff links 25 not only promotes vibration arresting and the stopping effect, but also provides for more or less centering effect of the markers in correct position relative to each other.

When it is desired to apply ink or other marking material to the markers, the handle 12 is rotated to adjust the plungers 16 downwardly into contact with the markers 17. The flat lower ends of the plungers will planify the markers and dispose the markers below the ring-frames, the stop devices 25 cooperating in promoting this planifying. Thus, the ring-frames will not interfere with the application of ink. As far as possible and when the markers are in position to be inked, they are held by the plungers 16 at equal distances from the frame 10 ready for being simultaneously inked. In this connection it may be noted that the plungers 16 in contact with the markers largely restrain tilting movements of the latter and promote inking. The numerals 28 (Figs. 3 and 4) indicate a plurality of marker-inkers disposed side by side and adapted for simultaneous contact with the markers 17 for applying ink to the latter. In the present embodiment, the marker-inkers 28 may either be upheld rigidly for receiving ink preliminarily to applying ink to the markers 17, or they may be resiliently upheld against movement under the pressure of inking the markers 17. To this end, each marker-inker 28 is upheld on the one hand by a spring 27 or the like, so that the marker-inkers 28 may move up and down relative to each other into and out of different planes, so as to accommodate relatively different planes in which the markers 17 may lie while being inked. As before explained, the markers 17 are designed to lie in a single plane, but this condition is not always assured. In case the markers lie in slightly different horizontal planes, it will be perceived that the marker-inkers 28 may contact with the markers 17 in the different planes of the latter. In Fig. 4 the marking apparatus is illustrated receiving ink from the inkers 28.

Figure 3:
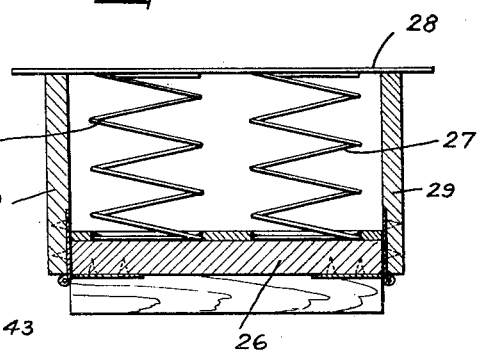
Fig. 3 is a cross-section of an inking device embodying certain features of the invention.

The inkers 28 are stiff plates, either of metal or glass or other relatively hard material. When it is desired to apply a fresh supply of ink to the inking plates 28, it is desirable to hold them in a single plane as illustrated in Fig. 3, in order that an inking roller may be passed rapidly back and forth across the series of plates 28. To this end braces 29 are movable into and out of position rigidly to uphold the marker-inkers 28. In the present embodiment, the springs 27 of the inking apparatus rest in recesses of a base frame 26, and each brace 29 is a stiff plate of a length to extend beneath the series of marker-inkers 28, the outer edge of these plates being straight. By turning the braces 29 in the position of Fig. 3, wherein the marker-inkers 28 rest upon the upper edges of the plates 29, the marker-inkers are rigidly upheld in position for being inked. It will be seen that the braces 29 and the springs 27 provide a means which is adjustable either for upholding each marker-inker rigidly or resiliently under inking pressure, whether the pressure be due to the inking roller or to the marking apparatus.

Whereas the invention herein referred to is exemplified in a portable, hand-operated apparatus of a convenient and efficient specific structure, it is to be understood that it is not limited to an apparatus of a small, portable character, nor to hand-operated devices. On the contrary, many of the important features of the invention may be carried out in power-actuated apparatus of relatively large size and designed for the purpose of marking many dozens of eggs at a single operation, and automatically to effect such multiple marking at repeated intervals.

Instead of making the marker-carrier of the same specific construction as that illustrated in Figs. 1 to 6 inclusive, it may be constructed as illustrated in Fig. 7, which includes a central flexible disc or diaphragm forming the marker-supporting portion 50 having a lateral flange 51 forwardly projecting or depending from the disk 50, the lower or free edge of the flange being in a plane below the marker 52, which latter is supported on the face of the disk 50. Being normally in advance of the marking surface, the free edges of the flange 51 can come in contact with the egg surfaces, especially surfaces of large eggs, or of eggs which are inclined to the direction of advance of the marker, and by contacting with the eggs the free edges of the flanges 51 are adapted to restrain skidding, or sliding of the marker-carrier on the egg and thus promote direct, printing contact of the marker 52 with the egg and while the marker-carrier is restrained from skidding or sliding on the egg. The skid-restraining flange 51 is made of soft, elastic, friction material, such as rubber, so that considerable friction is developed between the free edge of the flange and surface of the egg. By making the free edge of the flange relatively thin, or sharp, as indicated at 53, a quite secure anti-skid contact with the egg is made possible. The marker-carrier disk 50 with its skid-restraining flange 51 may be secured in the apparatus by any suitable means. In the form illustrated, the soft, elastic, rubber material of the disk is continued or projected rearwardly to form a laterally disposed, carrier-retainer flange 53′ which may be readily sprung over the advance edge of the metal ring-frame 54 and received and removably held in the outside peripheral groove 55 in this ring-frame. In this manner the marker-supporting disk 50, the skid-restraining flange 51, and the carrier-retaining flange 53′ are associated as a unit of a single piece of rubber which is readily mounted and demounted from the ring-frame 54 as may be desired.

It is to be understood that the flange 51 is merely illustrative of one form of skid-restraining device. The flange 51 provides a continuous, anti-skid rim around the central marking portion of the disk 50. This rim is adapted to contact the egg at a number of points in its periphery so as to steady the marker for application of imprint to the egg. However, the continuous rim or flange 51 may be replaced by a series of soft, elastic, rubber fingers 56 as illustrated in Fig. 8, which fingers may be spaced apart greater or less distances and will subserve similar purposes to the flange 51. The continuous type of finger as provided by the flange 51 has special advantages, however, and is to be preferred over the type illustrated in Fig. 8. It is to be understood, however, that either type is within the scope of the invention herein described.

Whereas in the embodiment illustrated the plungers 16 are moved into planifying contact with the markers preliminary to inking the latter, it is to be understood that, without departing from the invention, the plungers 16 may be held stationary and the markers moved up into contact with and so as to be planified by the stationary markers, or both the markers and the plungers may be moved to bring them into planifying relation. Whereas the invention is especially useful when embodied in apparatus having a plurality of markers associated together for marking a plurality of eggs at one operation, important aspects of the invention are realized in an apparatus having but one marker and utilizable for marking one egg at a time. It is, therefore, to be understood that an apparatus having one marker or a plurality of associated markers is within the purview of the invention.

Also, it is to be understood that when a very large number of eggs is to be marked, as for instance three dozen or more, instead of mounting all the markers upon a single frame, as for instance the frame 10 hereinbefore referred to, a number of separate frames 10 each carrying a plurality of markers may be employed, and the frames 10 operatively connected for having marking actuation imparted thereto in unison or sequentially, as may be desired.

Thus by the above are accomplished the objects hereinbefore referred to.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for marking eggs or the like including, in combination, a plurality of flexible diaphragms forming markers side by side, and means adapted, during the marking operation, to cooperate to flex said markers into marking contours differing from each other as the contours of the eggs to be marked differ from each other.

2. Apparatus for marking eggs or the like including, in combination, a plurality of markers side by side, said markers mounted for movement relative to each other, and means adjustable into and out of position for holding said markers in a substantially uniform inking plane with their marking surfaces exposed.

3. Apparatus for marking eggs or the like including, in combination, a plurality of markers side by side, resilient devices disposed to transmit marking pressure to each marker, and vibration-arresting means for said resilient devices.

4. Apparatus for marking eggs or the like including, in combination, a plurality of vibratable markers side by side, and vibration arresters, one for each marker.

5. Apparatus for marking eggs or the like including, in combination, a plurality of markers side by side, said markers mounted for movement relative to each other, and means adjustable relatively to the markers into and out of position for holding said markers in a substantially uniform inking plane, said holding means including adjustably reciprocally movable planifiers for urging the markers into said plane.

6. Apparatus for marking eggs or the like including, in combination, a plurality of markers side by side, said markers mounted for movement relative to each other, means adjustable relatively to the markers into and out of position for holding said markers in a substantially uniform inking plane, said holding means including adjustably reciprocally movable planifiers for urging the markers into said plane, and stop devices movable with said markers and cooperative to limit the extent of movement of said markers by said planifiers.

7. Apparatus for marking eggs or the like including, in combination, a plurality of markers side by side, means mounting said markers for tilting movement in different planes and relative to each other and for movement relative to each other into simultaneous marking contact with eggs at different levels, said markers being flexible into marking contours differing from each other as the contours of the eggs to be marked differ from each other, resilient devices disposed to transmit marking pressure to each marker and vibration-arresting means for said markers.

8. Apparatus for making eggs or the like including, in combination, a plurality of markers side by side, means mounting said markers for tilting movement in different planes and relative to each other and for movement relative to each other into simultaneous marking contact with eggs at different levels, said markers being flexible into marking contours differing from each other as the contours of the eggs to be marked differ from each other, marker-planifiers for the markers, respectively, and means operable for simultaneously adjusting said planifiers in and out of planifying position.

9. Apparatus for marking eggs or the like including, in combination, a plurality of markers side by side, means mounting said markers for tilting movement in different planes and relative to each other and for movement relative to each other into simultaneous marking contact with eggs at different levels, said markers being flexible into marking contours differing from each other as the contours of the eggs to be marked differ from each other, marker-planifiers for the markers, respectively, and means operable for simultaneously adjusting said planifiers in and out of planifying position, said mounting including rigid marker-carriers movable relative to each other, and carrier-stops cooperative with said carriers in obtaining the planifying effect on said markers.

10. Apparatus for marking eggs or the like including, in combination, a pressing frame, a marker movable toward and from said frame, a spring carried with said frame and disposed to urge said marker from said frame and resiliently to resist movement of said marker toward said frame, and a marker-planifier reciprocally adjustably movable on said frame into and out of contact with the rear of said marker.

11. Apparatus for marking eggs or the like including, in combination, a pressing frame, a marker movable toward and from said frame, a spring carried with said frame and disposed to urge said marker from said frame and resiliently to resist movement of said marker toward said frame, a marker-planifier reciprocally adjustably movable on said frame into and out of contact with the rear of said marker, said frame having a controlling handle adjustably movable thereon, and operative connections for moving said planifier by adjustable movement of said handle.

12. Apparatus for markings eggs or the like including, in combination, a pressing frame, a marker movable toward and from said frame, a spring carried with said frame and disposed to urge said marker from said frame and resiliently to resist movement of said marker toward said frame, a marker-planifier reciprocally adjustably movable on said frame into and out of contact with said marker, said frame having a controlling handle adjustably movable thereon, operative connections for moving said planifier by adjustable movement of said handle, and a latch for retaining said handle in adjusted positions having a latch-actuating thumb piece adjacent said handle.

13. Apparatus for marking eggs or the like including, in combination, a pressing frame, a marker movable toward and from said frame, a spring carried with said frame and disposed to urge said marker from said frame and resiliently to resist movement of said marker toward said frame, a ring-frame, and a soft, flexible sheet suspending said marker centrally of said ring-frame, said ring-frame interposed between said spring and said marker.

14. Apparatus for marking eggs or the like including, in combination, a pressing frame, a marker movable toward and from said frame, a spring carried with said frame and disposed to urge said marker from said frame and resiliently to resist movement of said marker toward said frame, and a stop device carried with said frame and disposed to cooperate to limit the extent of movement of said marker from said frame, said stop device comprising vibration arresters connected to said marker and carried with said pressing frame.

15. Apparatus for marking eggs or the like including, in combination, a pressing frame, a marker movable toward and from said frame, a spring carried with said frame and disposed to urge said marker from said frame and resiliently to resist movement of said marker toward said frame, and a stop device carried with said frame and disposed to cooperate to limit the extent of movement of said marker from said frame, a ring-frame, a soft flexible sheet suspending said marker centrally of said ring-frame, said stop device including a peripheral series of links connected to said ring-frame and slidably connected to said pressing frame.

16. Apparatus for marking eggs or the like including, in combination, a pressing frame, a marker movable toward and from said frame, a spring carried with said frame and disposed to urge said marker from said frame and resiliently to resist movement of said marker toward said frame, and a stop device carried with said frame and disposed to cooperate to limit the extent of movement of said marker from said frame, a ring-frame, a soft flexible sheet suspending said marker centrally of said ring-frame, said stop device including a peripheral series of links connected to said ring-frame and slidably connected to said pressing frame, said marker being flexible for conforming to eggs of different contours.

17. Apparatus for marking eggs or the like including, in combination, a portable pressing frame, a plurality of separate flexible markers carried by and movable toward and from said frame, a plate movable on said pressing frame toward and from said markers, a series of planifying plungers movable with said plate, helical springs intervening said pressing frame and the respective markers, means mounting said markers on said pressing frame for separate tilting movements one relative to another in divers directions, and means adjustable for moving said plate to dispose said plungers in position restraining said tilting movements of said markers.

18. Apparatus for marking eggs or the like including, in combination, a portable pressing frame, a plurality of separate, flexible markers, carried by and movable toward and from said frame, a plate movable on said pressing frame toward and from said markers, a series of planifying plungers movable with said plate, helical springs intervening said pressing frame and the respective markers, means mounting said markers on said pressing frame for separate tilting movements one relative to another in divers directions, means adjustable for moving said plate to dispose said plungers in position restraining said tilting movements of said markers, a shaft rotatively adjustable on said pressing frame, a connecting rod coupled to said shaft and plate, and a pin mounted on said pressing frame and movable into and out of position to latch said shaft against rotation.

19. Apparatus for marking eggs or the like including, in combination, a pressing frame, a ring-frame, a diaphragm marker carried by said ring-frame, a spring resiliently supporting said ring-frame against marking pressure and vibration-arresting means in operative contact with said spring.

20. Apparatus for marking eggs or the like including, in combination, a pressing frame, a ring-frame, a flexible marker carried by said ring-frame, a spring resiliently supporting said ring-frame against marking pressure, a plunger adjustable into and out of position flexing said marker into a plane below said ring-frame, and stop links connected to said ring-frame and slidable in said pressing frame.

21. Apparatus for marking eggs or the like including, in combination, a marker-carrier having a forwardly projecting skid-restraining flange and a rearwardly projecting carrier-retainer flange, each of soft, elastic rubber.

22. A marker-carrier having a central, marker-suspending portion and a forwardly projecting, lateral, skid-restraining flange, and a rearwardly projecting, lateral, carrier-retainer flange, the whole composed of soft, elastic rubber.

23. In combination, a disk having a marker supported on its face and a flange depending from the disk, the lower edge of the flange being in a plane below said marker, said disk and flange being a unit of soft, elastic rubber and said marker being of soft, flexible material adapted to flex with said disk, said flange having a relatively thin edge of soft, friction material.

24. Apparatus for marking eggs or the like including, in combination, a marker mounted for tilting movement, and a skid-restrainer having a thin edge of soft, friction material.

25. In an article marker, in combination, a marker element including a flexible diaphragm, mounting means mounting said marker element for universal tilting movement, and a plurality of stabilizing links for said marker element concentrically arranged with said mounting means.

26. In an article marker, in combination, marker elements mounted side by side for simultaneous individual cooperation with a plurality of articles, each marker element including a flexible diaphragm individually conformable to the article contour, individual mounting means mounting said marker elements for individual universal tilting movements, and a plurality of stabilizing links for each of said marker elements concentrically arranged with the respective mounting means thereof.

27. In an article marker, in combination, marker elements mounted side by side for simultaneous individual cooperation with a plurality of articles, each marker element including a flexible diaphragm individually conformable to the article contour, individual mounting means mounting said marker elements for individual universal tilting movements, and means adjustable into and out of position for planifying the respective marker elements.

28. In an article marker, in combination, marker elements mounted side by side for simultaneous individual cooperation with a plurality of articles, each marker element including a flexible diaphragm individually conformable to the article contour, individual mounting means mounting said marker elements for individual universal tilting movements, means adjustable into and out of position for holding said marker elements in predetermined inking positions, and a plurality of stabilizing links for each of said marker elements concentrically arranged with the respective mounting means thereof.

29. In an article marker, in combination, a marker element solely supported in article cooperative relation by flexible yielding centrally disposed supporting means and by a plurality of stabilizing links positioned in concentric relation about said supporting means.

30. In an article marker, in combination, a marker element including a flexible diaphragm solely supported in article cooperative relation by flexible yielding centrally disposed supporting means and by a plurality of stabilizng links positioned in concentric relation about said supporting means.

31. In an article marker, in combination, a marker element and a yielding flexible supporting means for said element including a resilient supporting member connected to said element and connected at a remote point thereof to a supporting structure so as to provide a universal swinging movement of said marker element about said remote point.

32. In an article marker, in combination, a marker element and a yielding flexible supporting means for said element including a resilient supporting member operatively connected to said element and operatively connected at a remote point thereof to a supporting structure so as to provide a universal swinging movement of said marker element about said remote point, and vibration damping means for said marker element concentrically arranged with said resilient supporting member.

33. In an article marker, in combination, a marker element including a flexible diaphragm and a yielding flexible supporting means for said element, including a resilient supporting member operatively connected to said element and operatively connected at a remote point thereof to a supporting structure so as to provide for universal swinging movement of said marker element about said remote point, and vibration damping means for said marker element concentrically arranged with said resilient supporting member.

34. In an article marker, in combination, a plurality of marker elements mounted side by side for simultaneous individual cooperation with a plurality of articles, each marker element including a flexible diaphragm individually conformable to article contours, a yielding flexible supporting means for each marker element including a supporting member operatively connected to the marker element and operatively connected at a remote point thereof to a supporting structure so as to provide for independent universal swinging movement of said marker elements about said remote points, and vibration damping means for each of said marker elements concentrically arranged with the respective resilient supporting members.

35. In an article marker, in combination. a plurality of marker elements mounted side by side for simultaneous individual cooperation with a plurality of articles, a yielding flexible supporting means for each of said marker elements including a resilient supporting member operatively connected to the marker element and operatively connected at a remote point thereof to a supporting structure so as to provide for independent universal swinging movement of said marker elements about said remote points, and vibration arresting means for each of said marker elements.

36. In an article marker, in combination, a marker element, and a yielding flexible supporting means for said marker element including a resilient supporting member operatively connected to said marker element and universally freely laterally swingable therewith.

37. In an article marker, in combination, a marker element including a flexible diaphragm, and a yielding flexible supporting means for said element including a spiral supporting spring operatively connected to said marker element, said spring at its attachment with the marker element being freely universally laterally swingable.

38. In an article marker, in combination, a marker element including a flexible diaphragm, and a yielding flexible supporting means for said element including a spiral supporting spring operatively connected to said marker element, said spring at its attachment with the marker element being freely universally laterally swingable, and vibration damping means for said marker element concentrically arranged with said supporting spring.

39. In an article marker, in combination, a marker element including a flexible supporting diaphragm and means including a flexible supporting device, for supporting said diaphragm for universal yieldingly resisted lateral swinging movement and for yieldingly resisted retractive movement.

40. In an article marker, in combination, a marker carrier and a marker element carried thereby, and a skid resisting device extending about said marker element and positioned in a plane therebelow.

41. In an article marker, in combination, a marker carrier and a marker element carried thereby, and a skid resisting device including a series of soft elastic fingers extending about said marker element and positioned in a plane therebelow.

42. An apparatus for marking eggs or the like, including, in combination, a pressing frame, and a plurality of thin, soft, flexible. rubber marker-sheets respectively supported from said frame for universal tilting movement, said sheets being free to flex and to conform at all points to the surface to be marked.

43. An apparatus for marking eggs or the like, including, in combination, a pressing frame, and a plurality of thin, soft, flexible. rubber marker-sheets respectively resiliently supported from said frame for universal tilting movement, said sheets being free to flex and to conform at all points to the surface to be marked, and vibration-arresters for the respective marker-sheets.

In testimony whereof I affix my signature.

CHARLES K. POWELL.